Fig.1

W.S. Bobier Jr.
W.H. Cowles
INVENTORS

Fig. 5

W. S. Bobier Jr.
W. H. Cowles
INVENTORS

ATTORNEY

Patented June 19, 1951

2,557,526

UNITED STATES PATENT OFFICE 2,557,526

ACCELERATION FUEL CONTROL RESPONSIVE TO AIR PRESSURE AND TEMPERATURE, SPEED, AND FUEL FLOW FOR GAS TURBINES

Wilfred S. Bobier, Jr., Grosse Pointe, and Warren H. Cowles, Detroit, Mich., assignors to George M. Holley and Earl Holley Application October 1, 1949, Serial No. 119,084

5 Claims. (Cl. 60—41)

1

The object of this invention is to control the fuel during acceleration as a function of temperature, pressure, turbine speed and fuel flow.

The preferred form of our invention requires a variable stroke pump, the stroke of which is shortened as a result of throttling the fuel and when the fuel throttle is open the stroke is increased automatically.

Figure 1:
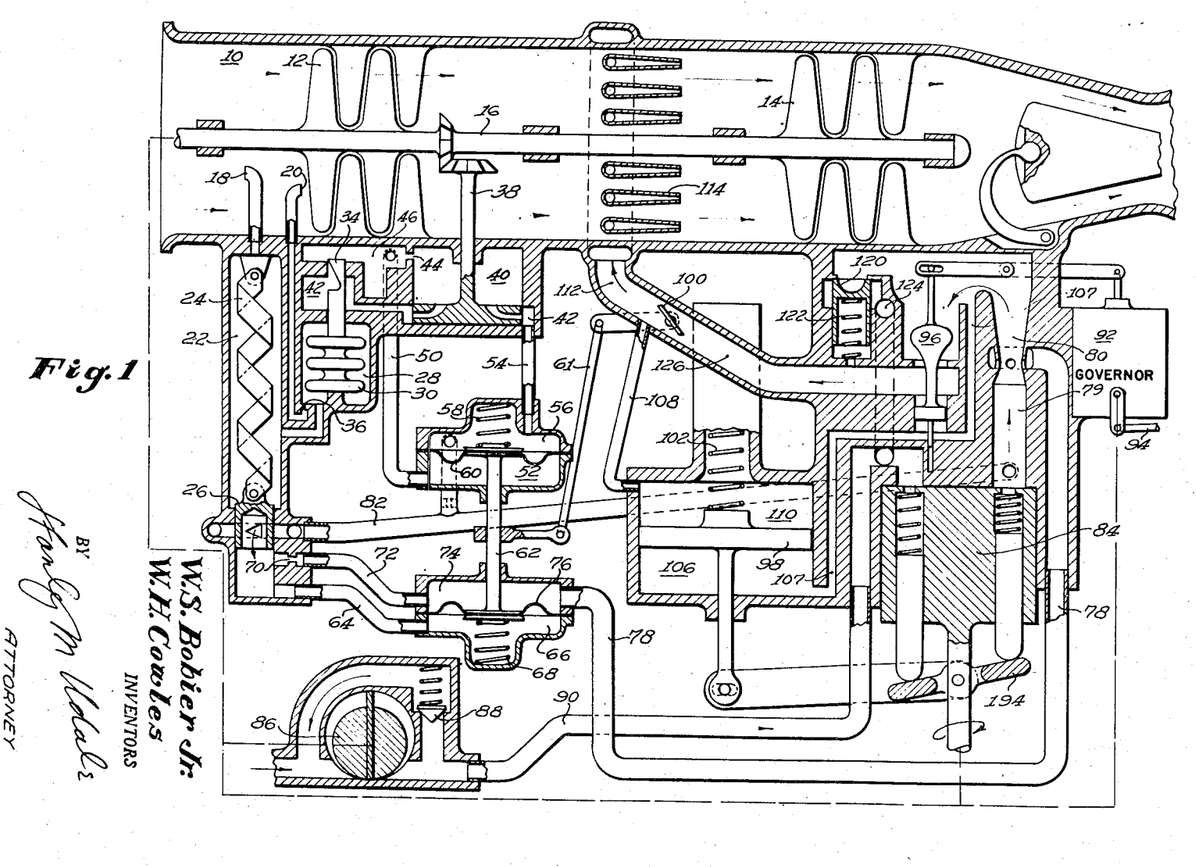
Fig. 1 shows diagrammatically the preferred form of our invention in its simplest form.

Description of Fig. 1

10 is the air entrance of a gas turbine. 12 is the air compressor driven by the turbine 14 through a shaft 16. 18 is the upstream element of a Pitot tube. 20 is the downstream element of a Pitot tube. 22 is the air temperature chamber subjected to the temperature of the air picked up by the tube 18. 24 is a temperature responsive element controlling a valve 26. 28 is the air pressure chamber freely connected to the chamber 22 and containing bellows 30, this pressure responsive element controls the pressure responsive valve 34. A restriction 36 connects the chambers 22 and 28 with the downstream tube 20 of the Pitot tube 18—20 so as to create an air circulation in chambers 22—28 and to subject chamber 28 to the impact pressure. A speed responsive element 38, driven by the shaft 16, creates a pressure difference between chambers 40 and 42 which pressure varies as the revolutions per minute squared. A restriction 44 connects the low pressure chamber 40 with the chamber 46 which is connected with the chamber 42, past the variable restriction created by the pressure responsive valve 34.

50 is a passage connecting the chamber 46 with a chamber 52. 54 is a passage connecting the chamber 42 with a chamber 56 containing a compression spring 58. 60 is a movable wall or diaphragm separating chambers 52 and 56 and engaging a shaft 62 which thus responds to both speed and pressure.

64 is a passage connecting the downstream side of the valve 26, which valve responds to temperature. 66 is a chamber connected to the passage 64 and containing a compression spring 68. 70 is a restriction downstream of the valve 26 and connected to the passage 72, which passage is connected to the chamber 74 above a moving wall or diaphragm 76 which also is connected to the rod 62 and which separates the two chambers 66 and 74. The passage 72 is connected through the passage 78 with the throat of the venturi 80 which supplies the fuel to the gas turbine 14. The movable wall or diaphragm 76 thus responds to fuel flow and to temperature.

82 is a passage connected to the upstream side 79 of the venturi 80 and to the upstream side of the fuel valve 26.

A variable stroke pump 84 obtains fuel through passage 90 from a low pressure fuel supply pump 86 which is furnished with the usual pressure relief valve 88.

A turbine driven governor 92, manually controlled by the lever 94, regulates the speed at any speed selected manually by the pilot. The fuel throttle valve 96 raises and lowers the pressure acting on the automatic control piston 98 as the governor control valve 94 is moved to call for more or less speed of the gas turbine.

During acceleration when the valve 96 is moved up to admit extra fuel so that the gas turbine may quickly attain the higher speed selected by the pilot, a valve 100 automatically regulates this extra quantity of fuel necessary for acceleration. This valve 100 is connected to the rod 62 by the link 61 and to the moving walls or diaphragms 60 and 76.

The piston 98 is loaded above with a compression spring 102 and regulates the stroke of the pump 84 by rocking the plate 104 in a well known manner. When valve 100 closes, the piston 98 rises as the pressure difference is then increased.

During acceleration the sudden opening of the valve 96 tends to lower the pressure in passage 107 and therefore in the chamber 106 below the piston 98 which then descends under the influence of the spring 102. 108 is a passage connecting the chamber 110, above the piston 98, with the fuel passage 112, downstream of the fuel acceleration control valve 100. 114 are the fuel nozzles connected to this fuel passage 112.

When running steadily the pressure drop around the valve 96 is maintained substantially constant by a constant pressure relief valve 120 which is held on its seat by a compression spring 122. 124 is the return fuel passage connected to the fuel inlet passage 90. The underside of the constant pressure valve 120 is subjected to the pressure in the fuel passage 126 downstream of the governor controlled valve 96.

Figure 2:
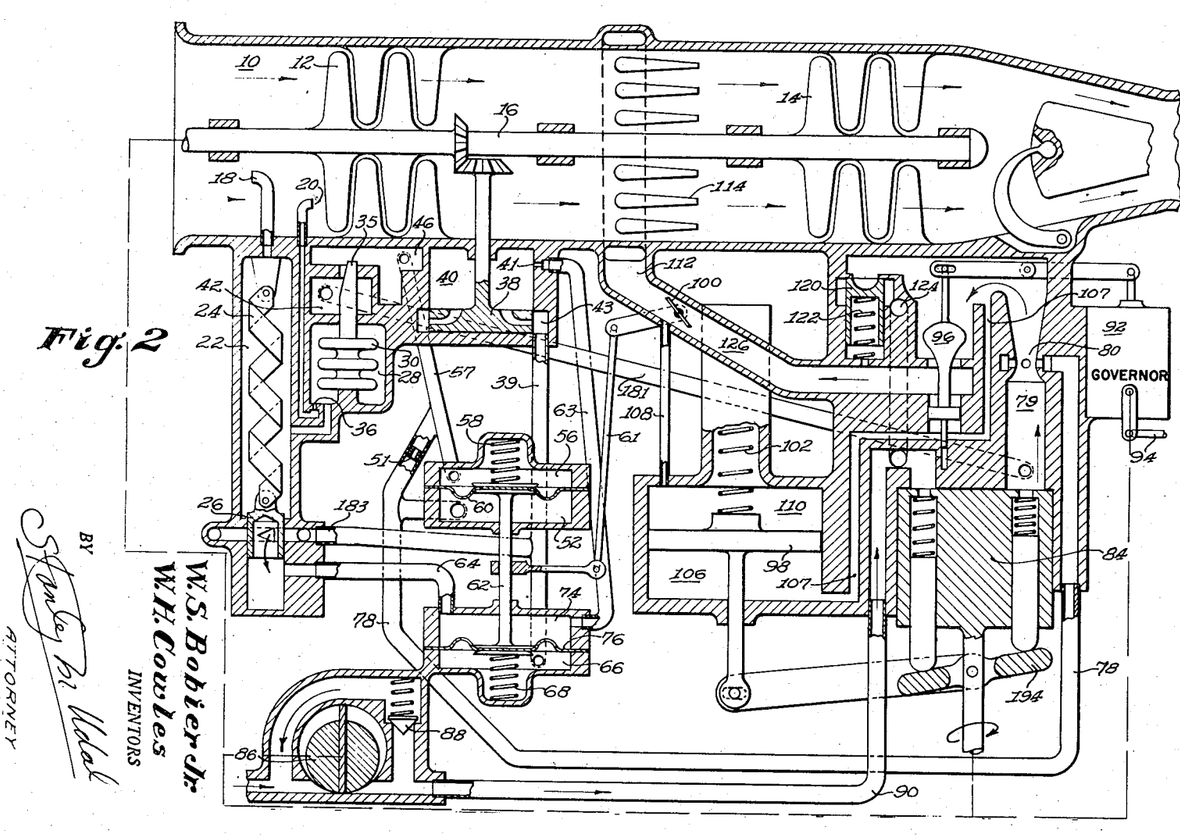
Fig. 2 shows diagrammatically an alternative form of our invention.

Description of Fig. 2

The same numbers are used in Fig. 2 for the similar parts used in Fig. 1.

The valve 35 is the reverse of valve 34 of Fig. 1 and it is raised by the expansion of the bellows 30. The chamber 42, below the valve 35, is now connected through the passage 181, with the passage 79, that is, with the fuel under pressure as delivered by the fuel pump 84 to the venturi 80. Chamber 46 is now connected to the chamber 56 through the passage 57. The chamber 52 is now connected through the passage 78 with the throat of the venturi 80. The passage 57 is in restricted communication with the passage 78 through the restriction 51. The passage 64 is in restricted communication with the chamber 40 through the restriction 41 and in free communication with the chamber 74. A passage 63 connects the restriction 41 with the chamber 74. Chamber 66 is connected through the passages 39 and 183 with the valve 26 controlled by the temperature responsive element 24, and also with the high pressure side of the speed responsive element 38 in chamber 42. The diaphragm 76 thus responds to speed and temperature. The diaphragm 60 responds to atmospheric pressure and fuel flow.

Figure 3:
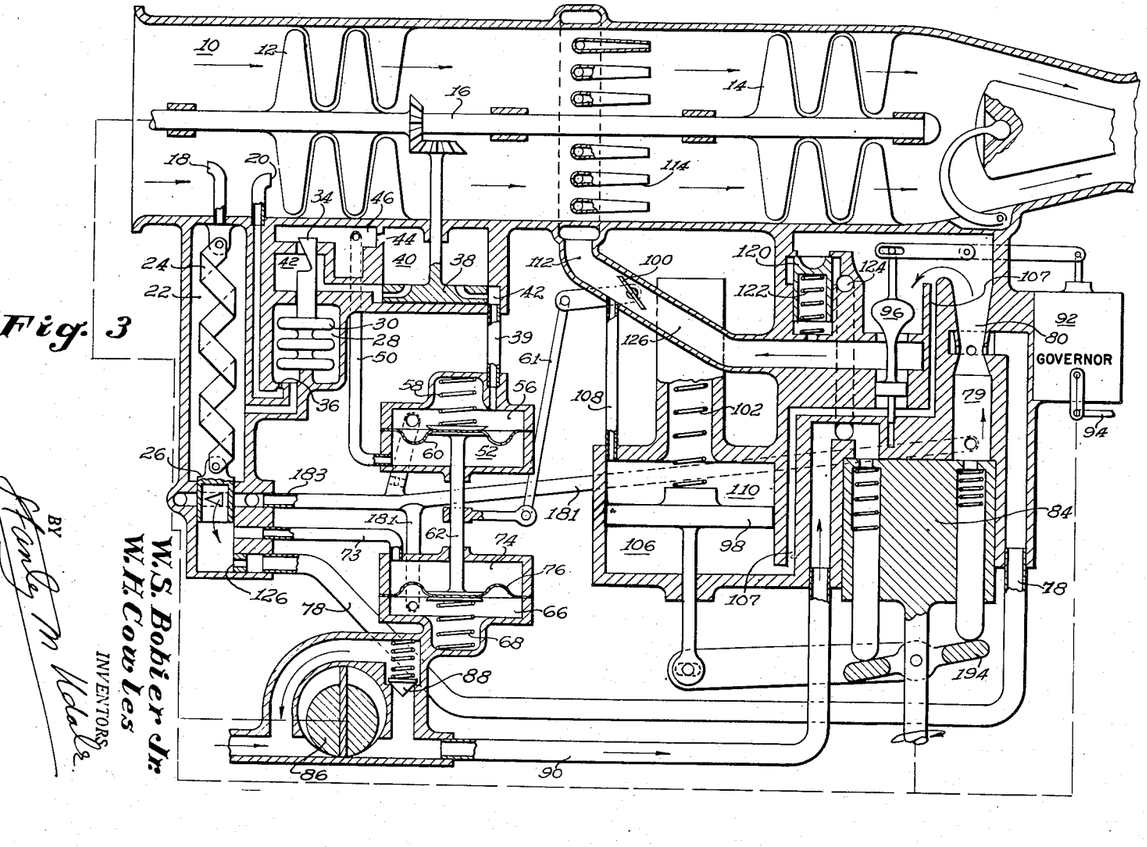
Fig. 3 shows diagrammatically an alternative form of our invention.

Description of Fig. 3

Passage 39 connects the high pressure chamber 42 from the speed responsive element 38 to the chamber 56. Passage 50 connects the chamber 52 with the chamber 46. As in Fig. 1 the valve 34 controls the pressure drop in response to atmospheric pressure acting on bellows 30.

Passage 73 connects the downstream side of temperature responsive valve 26 with chamber 74. Chamber 66 is connected through passage 181 with the fuel entrance 70 leading to the fuel venturi 80. Passage 78 is connected through restriction 126 with the passage 73. Passage 183 leads from chamber 66 to the upstream side of temperature responsive valve 26. Passage 78 is connected to the throat of venturi 80. The diaphragm 60 now responds to speed and atmospheric pressure. The diaphragm 76 now responds to fuel flow and to atmospheric temperature.

Figure 4:
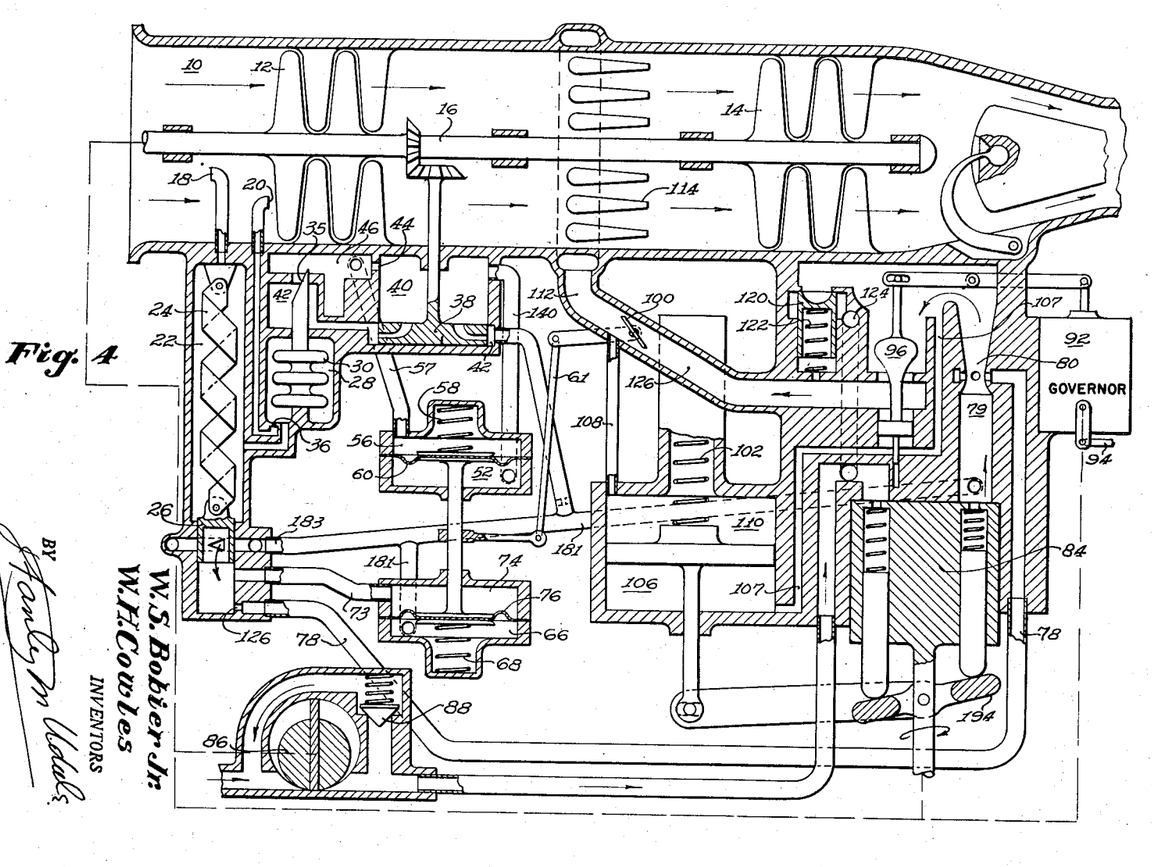
Fig. 4 shows diagrammatically still another alternative form of our invention.

Description of Fig. 4

Passage 140 connects chamber 40 with chamber 52. Passage 57 connects chamber 46 with chamber 56. Restriction 44 now connects chamber 46 with the low pressure existing in chamber 40 upstream of the speed responsive element 38. Valve 35 is controlled by the bellows 30, as in Fig. 2.

As in Fig. 3 passage 181 connects high pressure fuel from passage 79 with chamber 66. Passage 183 is connected to the upstream side of temperature responsive valve 26 and to the passage 181. As in Fig. 3 passage 78 is connected to the throat of the venturi 80 and to the restriction 126.

Chamber 74 is connected through the passage 73 to the downstream side of temperature responsive valve 26. Diaphragm 60 now responds to speed and atmospheric pressure. Diaphragm 76 responds to temperature and to fuel flow.

Figure 5:
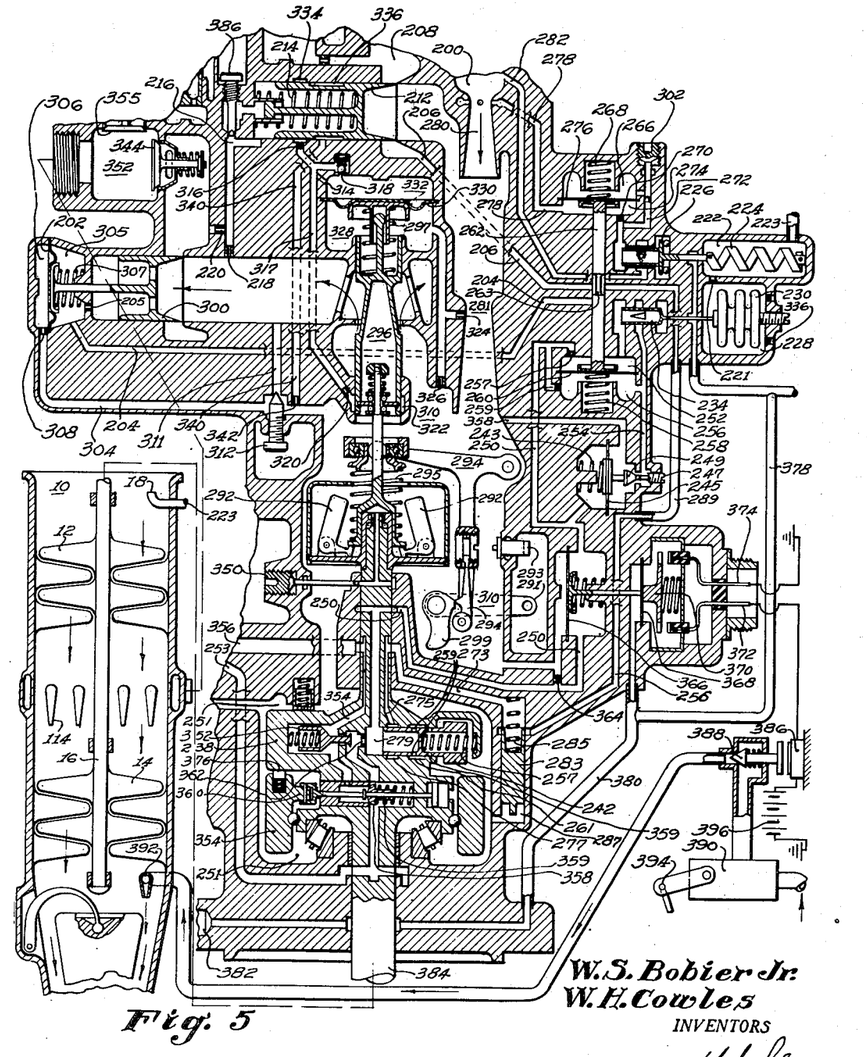
Fig. 5 shows the actual form that our invention takes when following the teaching of the diagrammatic drawing of Fig. 1.

Description of Fig. 5

Fig. 5 corresponds to Fig. 1 but the variable stroke pump and its control is not shown.

In Fig. 5 the fuel from the fuel pump flows from the fuel entrance 200 through the first fuel venturi 280 (corresponding to 80 of Fig. 1) and the depression in the throat is applied to the fuel flow diaphragm 276 (corresponding to 76 of Fig. 1) through the passage 278 which communicates with the chamber 274 below the diaphragm 276. The chamber 266, above the diaphragm 276, is connected to the pressure side of the first fuel venturi 280, through the passage 282 (corresponding to 82 of Fig. 1). Valve 226 (corresponding to valve 26 of Fig. 1) is controlled by temperature responsive element 224 and thus modifies the pressure transmitted through the passage 282 to the passage 272, which passage is in restricted communication with the chamber 274 through restriction 270. Diaphragm 276 thus responds to temperature and to fuel flow as does diaphragm 76 of Fig. 1. Compression spring 268 engages diaphragm 276 and tends to move rod 262 downward. Adjustable valve 302 checks the pulsations in the chamber 266.

The temperature responsive element is in a chamber 222 which corresponds to chamber 22 of Fig. 1. The entrance 223, to the chamber 222, is subjected to the impact pressure of the air entering the air entrance to the gas turbine air compressor unit 10. Entrance 223 is connected to the Pilot orifice 18.

Valve 234 (corresponding to 34 of Fig. 1) is controlled by the bellows 230 in chamber 228, which chamber is connected to chamber 222 containing the temperature responsive element 224, through the passage 221. A restriction 336 imposes the impact pressure on the bellows 230, as in Fig. 1.

The upper side of the speed diaphragm 260 (corresponding to diaphragm 60 of Fig. 1) is subjected to the low pressure side of the speed responsive device 242, through passage 250. The lower side of the diaphragm 260 (chamber 256) is subjected to a higher pressure applied through the passage 254. This passage is in communication with the fuel pressure in chamber 310 downstream of the second fuel venturi 281, through passage 358. The valve 234 thus modifies the pressure in chamber 252, above the diaphragm 260. Restrictions 257 and 259 render the valve 234 effective to cause the diaphragm 260 to respond to changes in speed and in atmospheric pressure just as the diaphragm 60 in Fig. 1 responds to changes in speed and in atmospheric pressure. A compression spring 258, corresponding to spring 268, opposes the spring 268.

The throttle valve 300 corresponds to valve 100 of Fig. 1 and is controlled by the movement of the rod 262 and port 263 through the diaphragm 202 corresponding to the link 61 of Fig. 1. Passage 204 is put into communication with low pressure passage 206 when the rod 262 and port 263 moves down. A high pressure in chamber 305, to the right of diaphragm 202, moves valve 300 in the opening direction.

Passage 206 communicates with the low pressure outlet passage 208 which is maintained at 15 pounds per square inch pressure by a valve, not shown. Valve 212 maintains a constant pressure drop across the governor valve 296 during steady running. The left side of valve 212 is supported by the compression spring 214 and by hydraulic pressure transmitted through passage 216 connected through the restriction 218 to the upstream side of valve 300. Passage 216 is also connected to the downstream side of valve 300 through the restriction 220. The valve 386 prevents surging of the valve 212.

Passage 304, below the passage 204, communicates with the chamber 306, to the left of diaphragm 202, through the restriction 308. Passage 304 is connected to the chamber 310 which is at the high pressure downstream of the second venturi 281.

A low speed bypass valve 312 allows fuel to bypass through passage 311 when the governor valve 296 is at idle. The "overshoot" and "droop" of the centrifugal governor 292 is controlled by the restrictions 314, 316 and check valve 318 and restriction 320 as described in Bobier application, Serial No. 58,647 filed November 6, 1948, Patent No. 2,515,074 and Orr application, Serial No. 31,583, filed June 7, 1948.

A port 322 is uncovered whenever the governor valve moves a certain distance upward to restrict fuel flow. Restrictions 316 and 320 modify the pressure in chamber 332. Restrictions 324 and 326, in the throat and exit of the second fuel venturi 281, determine the pressure in chamber 328, located below the diaphragm 330 which engages with valve 296 through compression spring 297.

Above the diaphragm 330 is the chamber 332 in which the pressure is regulated by the check valve 318 and also by the restrictions 314, 316 and 320, and by port 322.

Ports 334 in the housing and port 336 in the valve 212 line up with each other when valve 212 opens by moving to the left. Passage 340, with its restriction 342, are thereupon put in communication through ports 334 and 336 with restrictions 314, 316 and 320. Passage 317 connects the check valve 318 with restrictions 314, 316 and 320.

A check valve 344 is located in the fuel outlet passage 352. When an emergency fuel supply is admitted through check valve 355, valve 344 is automatically closed.

The governor control lever 294 is manually controlled by lever 291, through the cam 299, and engages compression spring 295 which varies the governor speed of the gas turbine. 293 is a low speed adjustment which determines the exact position of the lever 294 for low speed operation when the lever 291 is in the minimum fuel flow position. The governor weights 292 are driven by the shaft 384, which is driven by the turbine shaft 16. The adjustable valve 350 prevents the governor weights 292 from "hunting." Shaft 384 also drives the element 238.

The pressure in the passage 250 is maintained below the pressure in the housing 251 which is in free communication with chamber 310. A compression spring 257 loads the piston 242. Ports 259 line up with ports 261 in the wheel 238. A low pressure passage 273 communicates with a passage 275 which when the speed increases lowers the pressure in chamber 279 through the port 277 until the pressure in 279 balances the centrifugal force acting on the piston 242. The pressure in the chamber 279 thus falls as speed increases as described in Bobier application, Serial No. 58,647, filed November 6, 1948, Patent No. 2,515,074.

The low pressure in the passage 273 is derived from the low pressure outlet passage 208 through the passage 289. A piston valve 283, inside the cylinder 287, is loaded with a compression spring 285 so as to maintain the pressure difference between the chamber 251 and passage 273 at a constant value determined by the spring 285.

A spring loaded under-speed piston 352 is closed at all times except at minimum speed when it prevents the pressure in the pipe 253 from falling. The fall of the pressure in pipe 253 controls an emergency control for a second fuel supply so that if the speed called for is not attained the shift to the second fluel supply follows after a certain period of time. This is not shown in this application as it is the subject of co-pending Schorn et al. application, Serial No. 22,168, filed April 20, 1948.

An acceleration controlled valve 358, also controlled by a spring 359, prevents this shift taking place during acceleration. The effect of angular acceleration on a loose fly wheel 354 and through cam 360 opens the valve 358 during acceleration and a friction pad 376 prevents "hunting." The restriction 362 prevents this acceleration responsive valve 358 from interfering with the pressure in the chamber 279 during acceleration. This loose flywheel is also the subject of co-pending Bobier application, Serial No. 783,071, filed October 30, 1947.

In order to control the fluel supply to a tail burner by speed, a spring loaded diaphragm 366, subjected on the left to the full pressure of fuel in chamber 310 and on the right to the speed responsive pressure of the fuel in passage 250, is provided and this pressure falls in response to speed and is modified by the restriction 364. At high speeds diaphragm 366 moves to the right and diaphragm 368 also moves to the right at the same time as it is connected to the first mentioned diaphragm 366. Diaphragm 368 is subjected on the left to the low pressure in the drain passages 378, 380 and 382. Element 370 makes contact when it is thus moved to the right with the two electrical leads 372 and 374. 386 is an electrical solenoid which, when 370 engages 372 and 374 moves valve 388 to the right, fuel then flows from the tail burner control 390 to the tail burner 392. A manual control 394 is provided and a battery 396 provides the electrical energy to operate valve 388 and solenoid 386.

Diaphragm 245 modifies the fuel speed characteristics during the latter portion of the acceleration. A spring 243 holds the diaphragm against an adjustable stop 247.

The pressure admitted through passage 358 thus flows past the restriction created by the valve 249 and thus lowers the pressure in chamber 256. Passage 250 applies speed responsive pressure to the left hand side of diaphragm 245.

*Operation, Fig. 1*

As temperature rises valve 26 opens and raises the pressure in pipe 64 which, acting on the moving wall 76, causes the valve 100 to move in the direction of restricting the fuel flow. As the fuel flow increases in venturi 80 the drop in pressure in the chamber 74 increases which also causes the valve 100 to move towards its closed position.

As altitude increases the bellows 30 expand and the valve 34 opens. The pressure rise in the chambers 46 and 52 also cause the valve 100 to move towards its closed position.

As speed increases the pressure in chambers 42 and 46 increases which tends to move the valve 100 towards its more open position.

Hence, during acceleration the fuel supply is increased and descreased as these four controlling factors vary. By this means sufficient fuel is available for acceleration without any excess fuel which would raise the temperature of the turbine 14 to a dangerous degree.

*Operation, Figs. 2, 3, 4*

In Figs. 2, 3 and 4 the same four variables, temperature, pressure, fuel flow and speed are combined to produce the same result as with the arrangement in Fig. 1.

In Fig. 2 the lower diaphragm 76 responds to speed and temperature and the upper diaphragm 60 responds to altitude and fuel flow.

In Fig. 3 the lower diaphragm 76 responds to temperature and fuel flow and the upper diaphragm 60 responds to altitude pressure and to speed.

In Fig. 4 the lower diaphragm 76 responds to fuel flow and temperature and the upper diaphragm 60 responds to speed and altitude pressure.

*Operation, Fig. 5*

Assume that the turbine 14 is operating at a speed selected by lever 291 and that this lever is moved counter-clockwise to compress spring 295 so as to open valve 296 and cause this turbine to accelerate with more fuel. During the subsequent acceleration valve 212 closes under the influence of compression spring 214 so that the ports 334 and 336 are no longer in communication with each other. The port 322 is closed so that the passage 317 does not communicate with the fuel under pressure in chamber 310.

The governor then functions with the check valve 318 closed and the pressure in chamber 328 falls as the pressure in reset venturi 281 falls. In the meantime the valve 300 opens due to the rise in pressure downstream of valve 296. The degree of opening of valve 300 determines the amount of fuel supplied during the period of acceleration, just as valve 100 of Fig. 1 determines the amount of fuel supplied. The pressure in chamber 305 is determined by the restriction 205 which admits fuel at the pressure downstream of the valve 296 and the pipe 204 which is at a still lower pressure determined by the position of the port 263 in rod 262, which is the servomotor valve controlling valve 300. The position of the port 263 is determined by fuel flow, temperature atmospheric pressure and revolutions per minute of the turbine, as set forth in the operation of Fig. 1.

When the valve 262 moves up the pressure in chamber 305 rises and the valve 300 opens under the influence of spring 307 inside chamber 305. This rise is due to the leakage through the restriction 205. This opening movement of valve 300, in response to a movement of valve 262 and port 263 upward to increase fuel flow, is in response to a decrease in fuel flow, a decrease in atmospheric temperature, an increase in atmospheric pressure and an increase in turbine revolutions per minute. This gives the desired control of fuel during acceleration.

As the speed of the turbine approaches the governed speed selected by the position of the lever 291 the following control factors assume control: The weights 292 fly out and the valve 296 travels up. This causes a decrease in fuel flow through second venturi 281. This also causes an increase in pressure in the chamber 328, below the diaphragm 330. The port 322 is opened by the travel of the valve 296 in the upward direction under the influence of the centrifugal effect of weights 292. The constant pressure valve 212 descends and thus places the passages 317 and 340 in communication with each other through the ports 334 and 336. The lowered pressure in chamber 328, due to flow through second venturi 281, moves the diaphragm 330 down so as to check the travel of the governor valve 296 upward. As the governor valve 296 comes to rest the pressure in chamber 328 rises and the action of this rise in pressure is to check the too rapid closure of the valve 296. This prevents "droop" as set forth in Orr application, Serial No. 31,583, filed June 7, 1948, and Bobier application, Serial No. 58,647, filed November 6, 1948, Patent No. 2,515,074.

Figure 6:
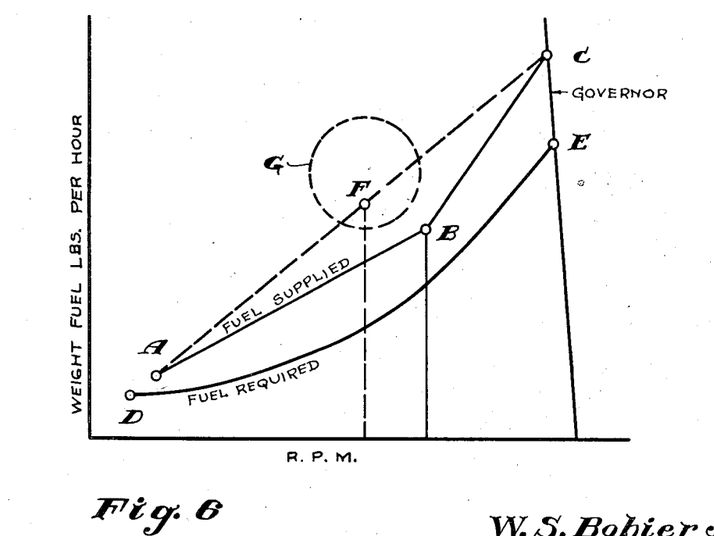
Fig. 6 is a chart which shows the relation between fuel flow and the speed of the turbine corresponding to the device shown in Fig. 5.

*Operation, Fig. 6*

This diagram explains the reason for the elements in Fig. 5. These elements are 243, 245, 247 and 249 which modify the normal control as shown in Figs. 1, 2, 3, 4, and 7.

In this diagram AB represents a straight line relationship between fuel and speed when valve 249 is against the stop 247 as shown. (See operation, Fig. 7.)

BC represents the fuel-speed characteristics until the moment when the valve 249 moves to the left. Full pressure from chamber 310 then enters chamber 256. The rate of fuel flow immediately increases along the line BC so that at all times the fuel supplied exceeds the fuel required as shown by line DE.

If the fuel line were to follow the straight line AFC the zone G would be bisected by the broken line AC. Zone G is a danger zone. A phenomenon known as "compressor stall," similar to "propeller cavitation," occurs in this zone G. The rate of acceleration is thus held down at point B until the danger of "compressor stall" is passed. This is accomplished by means of the elements 243, 245, 247, and 249.

It is not safe to feed fuel represented by point F at the lower speed indicated but it is safe to feed fuel at the rate indicated by point B at the higher speed indicated.

The governor valve 296 controls the governor line CE.

Figure 7:
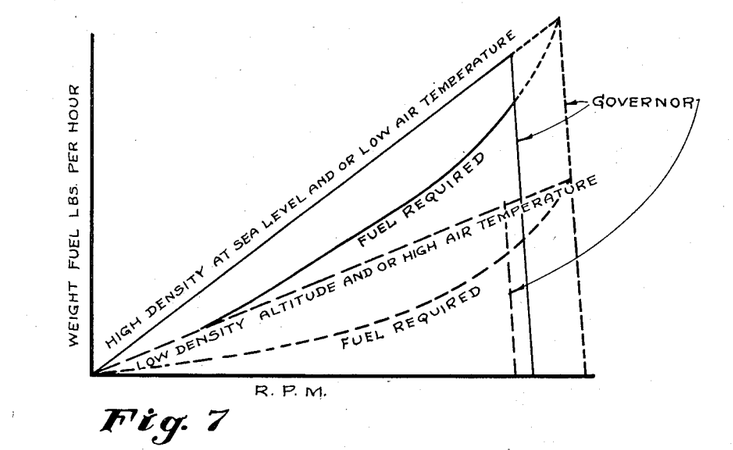
Fig. 7 shows the relation between fuel flow and the speed of the turbine corresponding to the devices shown in Figs. 1, 2, 3, and 4.

*Operation, Fig. 7*

In Fig. 7 the full line indicates the relationship at sea level and at low temperatures between fuel flow and turbine speed. The fall in pressure, due to fuel flow through the venturi (280 Fig. 5) balances the fall in pressure due to speed responsive elements (279, 257, Fig. 5) etc., as modified by the pressure responsive valve 234 and by the temperature responsive valve 226. The servomotor valves 262—263 control the valve 300 which throttles the fuel supply as shown by valve 100 in Fig. 1.

The drop in pressure in chamber 266 (Fig. 5) varies the rate of fuel flow squared through the venturi 280. The drop in pressure in chamber 279 (Fig. 5) varies as revolutions per minute squared. Hence, the straight line characteristic.

The broken lines show the effect of low pressure (altitude) on the valve 234 (Fig. 5) and the effect of high temperature on the valve 226 (Fig. 5).

Actually temperature falls with altitude, hence, the temperature effect serves to cancel out in part the low pressure altitude effect. Figs. 1, 2, 3, and 4 all conform to this flow characteristic.

The curved full line represents the fuel required which eventually meets the straight line representing the fuel available.

The curved broken line, below the curved straight line, represents the fuel required at altitude. The sloping line, to the right, represents governor control. The full line represents the governor characteristics at sea level.

What we claim is:

1. An acceleration fuel control means for a gas turbine having an air entrance, an air compressor, a combustion chamber and a gas turbine driving said air compressor, a source of fuel under pressure, a fuel passage leading to the combustion chamber, a manually variable governor responsive to the speed of the turbine adapted to regulate the fuel flow, manual means for increasing fuel flow by increasing the governing speed of said turbine, the improvement which comprises a device which regulates the fuel supply immediately after an increase in speed is called for and before the governor takes over the control of the fuel which includes a first control means responsive to atmospheric temperature, second control means responsive to atmospheric pressure, third control means responsive to the gas turbine speed which means furnishes a pressure which increases as the square of the gas turbine speed, fourth control means responsive to the rate of fuel flow in said fuel passage which furnishes a pressure which decreases with fuel flow, a first moving wall responsive to said second and third control means, a second moving wall responsive to said first and fourth control means, a fuel throttle valve located in said fuel passage and connected to both moving walls whereby an increase in speed tends to increase fuel flow, an increase in temperature of the air entering the air compressor tends to decrease fuel flow, an increase in pressure of the air entering the air compressor tends to increase fuel flow, and an increase in the rate of fuel tends to decrease the fuel flow.

2. An acceleration fuel control means for a gas turbine having an air entrance, an air compressor, a combustion chamber, a source of fuel under pressure, a fuel passage leading to the combustion chamber, a governor responsive to the speed of the turbine adapted to restrict the fuel flow, a variable stroke fuel pump in said passage, fuel pressure responsive means for reducing the stroke, manual means for increasing the fuel flow by increasing the governing speed of the turbine, the improvement which comprises control means automatically operative immediately after the fuel flow increases responsive to a call for more speed and before the governor takes over the control of the fuel which includes first control means responsive to the temperature of the entering air, second control means responsive to the pressure of the entering air, third control means responsive to the gas turbine speed which means furnishes a pressure which increases as the square of the gas turbine speed, fourth control means responsive to the rate of fuel flow in said fuel passage which furnishes a pressure which decreases with fuel flow, a first moving wall responsive to said second control means as modified by said third control means, a second moving wall responsive to said first control means as modified by said fourth control means, a fuel throttle valve located in said fuel passage and connected to both moving walls, a fuel pressure passage connected downstream of said fuel throttle and connected to the fuel pressure control means of said fuel pump to decrease the stroke of said fuel pump as said fuel throttle valve moves towards its closed position so as to increase the pressure drop at said fuel throttle valve.

3. An acceleration fuel control means for a gas turbine having an air entrance, an air compressor, a combustion chamber, a source of fuel under pressure, a fuel passage leading to the combustion chamber, a governor responsive to the speed of the turbine adapted to restrict the fuel flow, a variable stroke fuel pump in said passage, fuel pressure responsive means for reducing the stroke, manual means for increasing the fuel flow by increasing the governing speed of said turbine, the improvement which comprises control means automatically operative immediately after the fuel flow increases responsive to a call for more speed and before the governor takes over the control of the fuel which includes first control means responsive to the temperature of the entering air, second control means responsive to the pressure of the entering air, third control means responsive to the speed of the gas turbine which means furnishes a pressure which increases as the square of the gas turbine speed, fourth control means responsive to the rate of fuel flow in said fuel passage which furnishes a pressure which decreases with fuel flow, a first moving wall responsive to said second and fourth control means, a second moving wall responsive to said first and third control means, a fuel throttle valve located in said fuel passage and connected to both moving walls, a fuel pressure passage connected downstream of said fuel throttle and connected to the fuel pressure control means of said fuel pump to decrease the stroke of said fuel pump as said fuel throttle valve moves towards its closed position so as to increase the pressure drop at said fuel throttle valve.

4. An acceleration fuel control means for a gas turbine having an air entrance, an air compressor, a combustion chamber and a gas turbine driving said air compressor, a source of fuel under pressure, a fuel passage leading to the combustion chamber, a manually controlled governor responsive to the speed of the turbine adapted to control the fuel flow, manual means for increasing fuel flow by increasing the governing speed of said turbine, the improvement which comprises a device which regulates the fuel supply immediately after an increase in speed is called for and before the governor takes over the control of the fuel which includes a first control means responsive to temperature, second control means responsive to pressure, third control means responsive to the gas turbine speed, fourth control means responsive to the rate of fuel flow in said fuel passage which furnishes a pressure which decreases with fuel flow, a first moving wall responsive to said second and third control means, a second moving wall responsive to said first and fourth control means, a fuel throttle valve located in said fuel passage and connected to both moving walls whereby unbalanced forces on said moving walls are resolved into throttle valve motion which in turn results in an increase or decrease in fuel flow.

5. A device as set forth in claim 4 in which a servo valve is interposed between the two moving walls and a servo-mechanism is provided to regulate said fuel throttle valve.

WILFRED S. BOBIER, Jr.
WARREN H. COWLES.

No references cited.